Patented June 11, 1929.

1,717,059

UNITED STATES PATENT OFFICE.

RICHARD HENRY MORRIS, 3D, OF PHILADELPHIA, PENNSYLVANIA.

PLANT SOIL.

No Drawing.   Application filed August 20, 1925. Serial No. 51,333.

It is the object and effect of my invention to provide a soil adapted for the cultivation of mushrooms therein, but which may be advantageously employed in the cultivation of other plants.

As hereinafter described; my invention includes a soil of which the principal ingredient is peat, but which includes the residue of tender legume plants which have been fermented and decomposed therein; and, preferably such soil contains substances rendering it alkaline and toxic with respect to plant disease germs.

I find it convenient to prepare such a soil by spreading upon a natural bed of fibrous brown peat, comminuted limestone and phosphate rock to the amount of say, two tons per acre. Such alkaline ingredients counteract the tendency of the subsequent steps in the process to produce undesirable acidity and toxic factors in the soil. Moreover, such alkaline elements facilitate the subsequent fixation of nitrates in the soil. Upon the bed thus prepared I sow legume seeds inoculated with nitrogen fixing bacteria, and preferably soya beans. The legume plants are allowed to grow to maximum height of tender growth. I then disk them under the surface of the bed; strip off the top layer of the bed, say six inches deep; and pile the same and allow it to ferment until the legume plants are decomposed.

The calcium derivative aforesaid counteracts the acidity of such decomposition and affords beneficial environment for said bacteria.

I also prefer to include in such soil a material toxic to plant disease germs. For instance, bichloride of mercury or a phenol derivative.

The above described step of stripping off the top layer of the peat bed is advantageous, first in that it facilitates the maximum production of the improved soil from a given peat bed, by permitting the preceding steps to be repeated upon the bed to prepare another top layer for removal, while the material stripped off is being matured. Second, the maturing of the disked material is very greatly facilitated by removing the same from the bed and piling it; because, if allowed to remain in a layer but six inches deep upon the bed, fermentation is retarded by the escape of heat and may be entirely stopped by lowering of the atmospheric temperature; whereas, the material stripped off is disposed in a pile, from thirty to forty feet deep, in which the heat of fermentation is retained so that decomposition of the legume plants proceeds rapidly and the soil is matured in a fraction of the time that would be required if it were permitted to mature upon the peat bed. Such hastening of the maturing process is due to the conservation of the heat in the pile which facilitates the work of the thermophilic bacteria which are of the most energetic cellulose decomposing types. Moreover, such conservation of heat in the pile facilitates the oxidization of the nitrogen, the chemical action of lime on the organic material, the formation of organic phosphates, and the destruction of seeds and other unfavorable germs. Third, whereas, if the material were left in the aforesaid thin layer upon the peat bed, the highly available plant foods derived from the legumes would be leached away by rain; on the contrary, such foods are retained and conserved in the pile. Moreover, such high moisture condition in the thin layer upon the peat bed affords an anaerobic environment which encourages the denitrification of the nitrogen into $NH_3$ which is lost into the atmosphere; whereas, no such loss occurs in the pile. Fourth, the heat due to fermentation in the pile is sufficient to change the inert peat into substances which are more fermentable and available to plants; whereas, such changes are not effected in the thin layer upon the peat bed.

I have found soya beans preferable to other legumes, because they have a somewhat higher urease content. The urease has the important function of breaking down the urea of the mass into forms which are more available for plant nourishment and also act on the resistant peat to break it down; the reaction being as follows:

(1) $CON_2H_4 \rightarrow HNCO + NH_3$
(2) $HNCO + H_2O = NH_3 + CO_2$

In such reaction, the urease acts as a catalyst and the $NH_3$ acts to break down the peat into water soluble ammonia compounds which are thus rendered available to the favorable bacteria and plants and may be oxidized to nitrates. Furthermore, the urease contained in soya beans is associated with a glycocoll-like substance which accelerates its reactions aforesaid. It is to be particularly noted that drying diminishes the apparent urease content and such drying is prevented by the piling aforesaid. Soya beans can withstand a higher temperature than clover, etc., and grow more readily upon the peat than any other legumes.

The soil thus prepared may then be shredded to break up the fibers therein and uniformly mix the same throughout the mass.

The final product aforesaid may then be used in the formation of beds for the growth of mushrooms or other plants and is remarkably promotive of plant growth. The importance of N to the mushroom may be understood from the fact that as much as thirteen percent, of the dry weight of mushroom plants is, or can be, urea, and an equal amount in other forms of nitrogen. The inclusion of lime in my prepared soil is highly desirable to permit the soya beans to thrive better in the peat and also prevent the accumulation of acids in the compost pile from the fermentation of the greens. It forms available salts with the organic acids produced and encourages the growth and increases the nitrogen content of the greens, and mushrooms thrive better in soil where lime is present. The phosphate is not only advantageous in facilitating the growth of the legume roots, but because of the sensitivity of the urease to acids and alkalis. Moreover, the phosphate encourages reproduction, which is essential in mushroom growing. However, such prepared soil may be mixed with other soils of different kinds to increase the fertility of the latter.

Therefore, I do not desire to limit myself to the precise details of procedure herein set forth as it is obvious that various modifications may be made therein without departing from the essential features of my invention as defined in the appended claims.

I claim:

1. The method of forming a commercial plant soil, which includes distributing comminuted limestone and phosphate rock upon the surface of a natural bed of brown fibrous peat, to the amount of substantially two tons per acre; planting in the bed thus prepared soya beans inoculated with nitrate fixing bacteria; allowing plants to grow from said beans to the maximum height of tender growth; then disking the bean plants beneath the surface of said bed; stripping off a layer of substantially six inches depth from the top of said bed; piling the material thus stripped off, and allowing it to ferment until the bean plants are decomposed; then shredding the mass to break up the fibers therein and uniformly mixing the same throughout the mass; and including in said mass, at any stage of said procedure, a material toxic to plant disease germs.

2. The method of forming a commercial plant soil, which includes distributing a calcium derivative upon the surface of a natural bed of fibrous peat, to an amount in excess of one ton per acre; planting in the bed thus prepared soya beans inoculated with nitrate fixing bacteria; allowing plants to grow from said beans; then turning the bean plants beneath the surface of said bed; stripping off a layer from the upper part of said bed; piling the material thus stripped off and allowing it to ferment until the bean plants are decomposed; then shredding the mass to break up the fibers therein and uniformly mixing the same throughout the mass; and including in said mass, at any stage of said procedure, a material toxic to plant disease germs.

3. The method of forming a commercial plant soil, which includes distributing a calcium derivative upon the surface of a natural bed of fibrous peat, to an amount in excess of one ton per acre; planting in the bed thus prepared soya beans inoculated with nitrate fixing bacteria; allowing plants to grow from said beans; then turning the bean plants beneath the surface of said bed; stripping off a layer from the upper part of said bed; piling the material thus stripped off and allowing it to ferment until the bean plants are decomposed; then shredding the mass to break up the fibers therein and uniformly mixing the same throughout the mass.

4. The method of forming a commercial plant soil, which includes distributing an alkaline material upon the surface of a natural bed of fibrous peat, to an amount in excess of one ton per acre; planting in the bed thus prepared legumes inoculated with nitrate fixing bacteria; allowing plants to grow from said legumes; then turning said plants beneath the surface of said bed; stripping off a layer from the upper portion of said bed; piling the material thus stripped off and allowing it to ferment until said plants are decomposed; then shredding the mass to break up the fibers therein and mixing the same throughout the mass; and including in said mass, at any stage of said procedure, a material toxic to plant disease germs.

5. The method of forming a commercial plant soil which includes distributing an alkaline material upon the surface of a natural bed of fibrous peat, to an amount in excess of one ton per acre; planting in the bed thus prepared legumes inoculated with nitrate fixing bacteria; allowing plants to grow from said legumes; then turning said plants beneath the surface of said bed; stripping off a layer from the upper portion of said bed; piling the material thus stripped off and allowing it to ferment until said plants are decomposed; then shredding the mass to break up the fibers therein and mixing the same throughout the mass.

6. The method of forming a commercial plant soil which includes distributing an alkaline material upon the surface of a natural bed of fibrous peat, to an amount in excess of one ton per acre; planting in the bed thus prepared legumes inoculated with nitrate fixing bacteria; allowing plants to grow from said legumes; then turning said plants beneath the surface of said bed; stripping off a layer from the upper portion of said bed; piling the material thus stripped off and allowing it to ferment until said plants are decomposed.

7. The method of forming a commercial plant soil which includes distributing alkaline material upon the surface of a bed of peat; planting legumes in the bed thus prepared; allowing plants to grow from said legumes; turning said plants beneath the surface of said bed; allowing said mass to ferment until said plants are decomposed; then shredding the mass to break up the fibers therein; and including in said mass, at any stage of said procedure, a material toxic to plant disease germs.

8. The method of forming a commercial plant soil which includes distributing alkaline material upon the surface of a bed of peat; planting legumes in the bed thus prepared; allowing plants to grow from said legumes; turning said plants beneath the surface of said bed; allowing the mass to ferment until said plants are decomposed; and including in said mass, at any stage of said procedure, a material toxic to plant disease germs.

9. The method of forming a commercial plant soil which includes distributing alkaline material upon the surface of a bed of peat; planting legumes in the bed thus prepared; allowing plants to grow from said legumes; turning said plants beneath the surface of said bed; allowing the mass to ferment until said plants are decomposed; then shredding the mass to break up the fibers therein.

In testimony whereof, I have hereunto signed my name at Philadelphia, Pennsylvania, this eleventh day of August, 1925.

RICHARD HENRY MORRIS, III.